United States Patent [19]

Szybicki

[11] Patent Number: 4,756,019
[45] Date of Patent: Jul. 5, 1988

[54] TRAFFIC ROUTING AND AUTOMATIC NETWORK MANAGEMENT SYSTEM FOR TELECOMMUNICATION NETWORKS

[76] Inventor: Edmund Szybicki, 15, Avenue Francois Besson, 1217 Meyrin, Switzerland

[21] Appl. No.: 900,756

[22] Filed: Aug. 27, 1986

[51] Int. Cl.$^4$ ............................................ H04M 15/32
[52] U.S. Cl. .................................... 379/112; 379/115; 379/221
[58] Field of Search ................................ 379/111–113, 379/133–139, 219–221, 229–230, 272–273, 115, 116

[56] References Cited

U.S. PATENT DOCUMENTS

| | | | |
|---|---|---|---|
| 3,560,663 | 2/1971 | Lee et al. | 379/221 X |
| 4,284,852 | 8/1981 | Szybicki et al. | 379/221 |
| 4,345,116 | 8/1982 | Ash et al. | 379/221 |
| 4,629,830 | 12/1986 | Daisenberger | 379/138 X |
| 4,669,113 | 5/1987 | Ash et al. | 379/221 |

OTHER PUBLICATIONS

Ash et al, "AT&T Carves New Routes in its Nationwide Networks", AT&T Bell Laboratories Record (Aug. '84), vol. 62, No. 6, pp. 18–22.
Mocenigo et al, "Managing a Network that Won't Sit Still", AT&T Bell Laboratories Record, (Aug. 87), vol. 62, No. 6, pp. 23–26.
E. Syzbicki, "Adaptive, Tariff Dependent Traffic Routing and Network Management in Multi-Service Telecommunications Networks", 11th International Teletraffic Congress in Kyoto, Japan, Sep. 4–11, 1985.

Primary Examiner—James L. Dwyer
Attorney, Agent, or Firm—Kane, Dalsimer, Sullivan, Kurucz, Levy, Eisele and Richard

[57] ABSTRACT

An adaptive, tariff dependent traffic routing system, which controls routing of traffic and performs management of network resources in multi-node telecommunication networks, where the cast for a communication depends on the type of service provided and on the distance between the originating node and the destination. Each node can originate traffic, receive and/or transmit traffic over inter-node trunks. The system is realized by means of a central computer, which has connections to the Stored Program Control (SPC) nodes of the network over two-way data links. The computer has access to data stored in the computer's memory, containing the actual distance- and service sensitive tariffs applied in the network. By freqent scanning of the network, the computer has a global view of the actual out-of-service and traffic load status in the nodes and in the different trunk groups. Based on the tariffs and on the global network status view the system determines the policy for routing traffic in the network, such that the revenue is maximized. When determining the routing decisions, the out-of-service and overloaded network equipment is automatically by-passed. Similarly, traffic to out-of-service, overloaded, or hard-to-reach destinations is not allowed to enter the network. The same applies to traffic destined to access-restricted nodes. The routing policy is transmitted to the SPC nodes in terms of routing instructions, specific for each originating node and each destination as well as specific for each type of services. Since new instructions are issued after each network scanning, these will vary with the actual traffic and out-of-service situation in the network. In this way an adaptive, revenue maximizing traffic routing and network management system is achieved.

10 Claims, 9 Drawing Sheets

FIG. 3
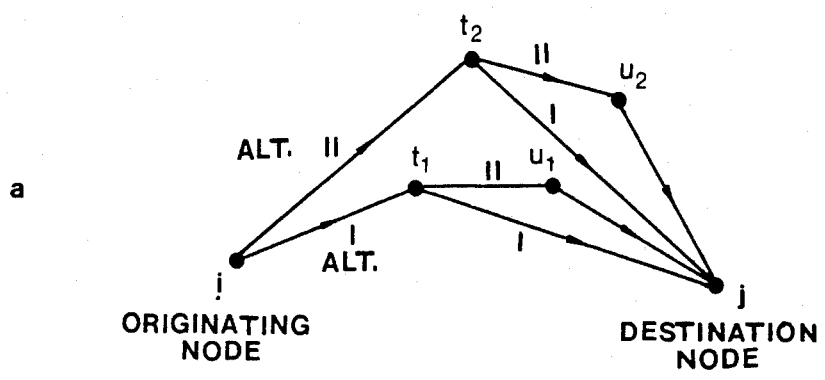
a
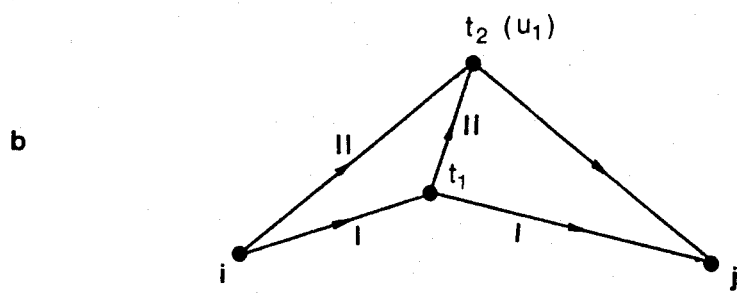
b
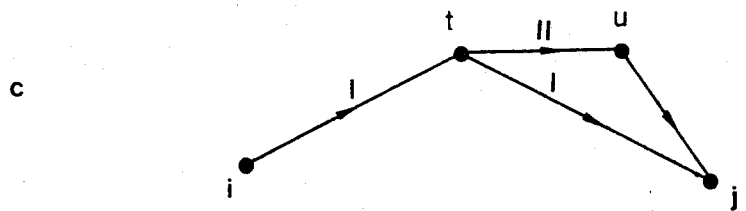
c
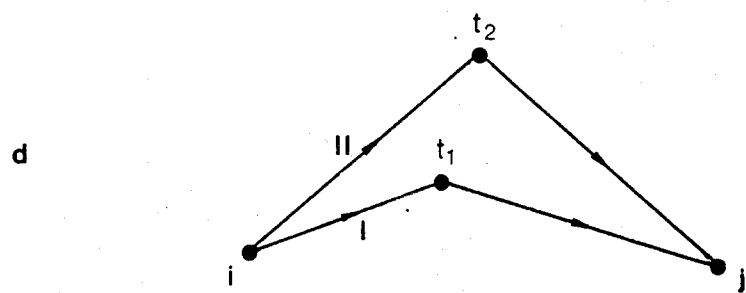
d

| LINK | CALLS | HANDLED TRAFFIC | TRA OFF | TOT TRNKS | HOLD TIME | HTI | TLOAD | LSO |
|---|---|---|---|---|---|---|---|---|
| 1 | 13726 | 1323.5 | | | | | | |
| 2 | 2012 | 204.5 | | | | | | |
| 3 | 1297 | 120.4 | | | | | | |
| 4 | 17 | 1.4 | | | | | | |
| 5 | 0 | 0.0 | | | | | | |
| 6 | 0 | 0.0 | | | | | | |
| TOTAL | 17052 | 1650.1 | 1745.9 | 2675 | 209.02 | 0.6169 | 0.7848 | 0 |

| SERVICE | IGT CALLS | HANDL CALLS | MINTS SRVD | REV $ | TOT CONG |
|---|---|---|---|---|---|
| 1 | 9148 | 8624 | 29889.6 | 119595.6 | 0.057 |
| 2 | 8935 | 8428 | 29514.3 | 58086.6 | 0.057 |
| TOTAL | 18083 | 17052 | 59403.9 | 177682.2 | 0.057 |

FIG. 6

PRESENT ART, FIXED-HIERARCHICAL ROUTING

| LINK | HANDLED CALLS | HANDLED TRAFFIC | TRA OFF | TOT TKNKS | HOLD TIME | HTT | TLOAD | LSO |
|---|---|---|---|---|---|---|---|---|
| 1 | 14040 | 1356.3 | | | | | | |
| 2 | 2442 | 241.0 | | | | | | |
| 3 | 1406 | 129.3 | | | | | | |
| 4 | 0 | 0.0 | | | | | | |
| 5 | 0 | 0.0 | | | | | | |
| 6 | 0 | 0.0 | | | | | | |
| TOTAL | 17888 | 1726.8 | 1745.9 | 2671 | 208.51 | 0.6465 | 0.8334 | 0 |

| SERVICE | TOT CALLS | HANDL CALLS | MINTS SRVD | REV $ | TOT CONG |
|---|---|---|---|---|---|
| 1 | 9148 | 9101 | 31555.8 | 123878.2 | 0.005 |
| 2 | 8935 | 8787 | 30607.7 | 59349.0 | 0.017 |
| TOTAL | 18083 | 17888 | 62163.4 | 183227.2 | 0.011 |

FIG. 7

ADAPTIVE, TARIFF DEPENDENT ROUTING
(THE INVENTION)

10 seconds scanning interval

PRESENT ART

FIXED-HIERARCHICAL ROUTING

INTERCITY NETWORK CONFIGURATION

TRAFFIC ROUTING AND AUTOMATIC NETWORK MANAGEMENT SYSTEM FOR TELECOMMUNICATION NETWORKS

FIELD OF THE INVENTION

The invention relates to the control of traffic routing in telecommunication networks, where communications between nodes (exchanges) of the network are established over inter-node transmission facilities (trunks).

The principal function of the invention is to route traffic in the network such, that the revenue is maximized. The routing mechanism of the invention, therefore, uses the distance- and service differentiated tariffs applied in the network as control parameters. The invention, therefore, specifically applies to:

(1) intercity telephone networks, where different tariffs are applied for communications, depending on the distance between the nodes and sometimes depending also on the hour of the day;

(2) integrated services networks (ISN), where in addition different tariffs may apply to different types of services.

However, the invention makes use of a general purpose routing algorithm, so that it can also be used in flat rate rate networks, such as:

(3) metropolitan telephone networks,
(4) private (PABX) networks,
(5) data communications networks,
(6) security and military communication networks.

Any type of nodes can be used, however, the network must accommodate at least 5 nodes of the so called Stored Program Control type to benefit from the invention. In other words, at least 5 nodes of the network must use computer control.

FIG. 1 shows an example of a telephone network, where nodes 1 through 5 are telephone exchanges of the Stored Program Control type (computer control) and nodes 6, 7 and 8 are exchanges using marker control (mechanical relay control). Any type of transmission facilities between the nodes can be used. Each such facility can accommodate several channels, or trunks, which constitute a trunk group. The trunks can be of one-way type (to be used in one direction), or of two-way type, which can be used in both directions.

DESCRIPTION OF THE PRIOR ART

The presently used telecommunication networks use both the hierarchical and non-hierarchical design. In both cases the network is dimensioned such, that for a given node-to-node communication traffic intensity, the amount of network equipment is determined so that the probability of network congestion does not exceed a given predetermined figure.

The set up of the necessary connection for a communication between an originating node and a destination node is made in a fixed and predetermined manner. The direct trunks between the nodes are used as a first choice for the connection. Should all the direct trunks be occupied, the connection can be set up as overflow over other nodes using two, or more trunks in tandem. The traffic routing scheme in the case of hierarchical design can be briefly characterized as:

sequential and hierarchical hunting for a free path between the call originating node and the destination node;
step-by-step set up of connections;
each node makes individual routing decisions.

In such a network design, overflow calls may enter the network even if from the distant tandem node no further path to the destination exists due to overload, or equipment out-of-service. This sort of unsuccessful connections produces an extra and ineffective traffic load in the network, which in extreme overload situations can lead to serious operational network disturbances. In those situations network managers perform network management by rerouting of traffic. This is done by changing traffic routing tables in the different nodes. At present this procedure is executed on a more or less manual basis. Since it is time consuming the interventions may be too late and hence they may be inadequate, have no effect, or may even worsen the situation.

Due to the particular way of routing overflow traffic, the different trunk groups carry both the direct traffic to the destination and overflow traffic to another destination node. The prior art of traffic routing in telecommunications networks disregards the fact that the different traffic parcels are subject to different tariffs, which is the case for instance in the intercity networks.

BACKGROUND OF THE INVENTION

In present telephone networks, alternative routing is used to handle traffic between a call originating exchange node and the destination exchange node. The direct trunks between these nodes are used as a first choice for the establishment of the connection. Should all the direct trunks be occupied, the overflow is routed over one, or more other nodes in tandem. Thus a trunk group between two nodes may handle direct traffic to a destination and some portion of overflow traffic to another destination.

Existing traffic routing systems in telephone networks route traffic without regard to applied tariffs. However, in the case of intercity networks different tariffs are applied for calls to different cities, depending on the distance. Since an overflow connection occupies two, or more trunks in series, it blocks in this way paths for the direct traffic in several trunk groups. It may occur that a low revenue overflow connection has blocked paths for the more profitable direct traffic parcels. This may be especially true during overload situations when the percentage of overflow connections is increased.

The situation may be even more accentuated in the future integrated services networks (ISN), where the tariffs will depend not only on the intercity distances, but also on the type of service provided. Since the present traffic routing systems disregard tariffs, they do not result in maximum revenues.

Another deficiencies of present routing systems is that each node routes traffic without regard to the actual out-of-service and overload status in the entire network. Thus, calls may enter the network even if no free path to the destination exists, relevant equipment is overloaded, or out-of-service. These calls must be released, but have occupied the network for some time without being successful, blocking in this way paths for calls, which could get through. This phenomenon contributes to non-effective traffic, loading the network and resulting in drop of revenues. As mentioned earlier, the presently practiced network management on manual, or semi-automatic basis is too slow for the relatively quick traffic variations. Late interventions may be inadequate, have no effect, or even worsen the situation.

The objective of the invention is to eliminate these deficiencies and to provide a traffic control mechanism, which results in maximum revenue traffic routing.

BRIEF DESCRIPTION OF THE DRAWINGS

FIGS. 3a-d is a schematic showing various feasible tandem paths existing between an originating node and a destination node.

FIG. 6 is a chart showing the statistical results obtained when using the hierarchical routing techniques of the prior art.

FIG. 7 is a chart showing the statistical rates obtained using the adaptive, tariff dependent routing method of the present invention.

SUMMARY OF THE INVENTION

The invention relates to a computer based traffic routing and automatic network management system, which routes traffic in telecommunication networks with regard to applied distance- and service sensitive tariffs, such that the total revenue from handling traffic by the network is maximized and such, that the revenues are automatically protected in case of overload in the network. In routing the traffic, the system automatically performs also the following functions:

(1) by-pass of overloaded and out-of-service network equipment, (2) Blocking of calls at origin to overloaded, out-of-service, or hard-to-reach destinations.

(3) Blocking of calls at origin to restricted destinations.

Based on tariff differences, the system can for instance control discount traffic on a 24 hours-a-day basis.

Apart from the automatic network management functions, the system has facilities for on-demand interventions, which can quickly be activated over computer console. These are for instance:

(4) Reservation of path between two nodes for a given point of time.

(5) Definition of restricted destinations.

(6) Blocking of given nodes, or trunk groups for certain type of services.

(7) Definition of network scanning interval.

(8) Modification of network definition.

The on-demand interventions are executed by means of a special System Management & Intervention Language (SMIL), which due to modular design can easily be extended to accommodate other on-demand interventions as needed.

DETAILED DESCRIPTION OF THE INVENTION

The principle of the invention has been first described in the article "Adaptive, Tariff Dependent Traffic Routing and Network Management In Multi-Service Telecommunications Networks" presented by the inventor at the 11th International Teletraffic Congress in Kyoto, Japan Sept. 4-11, 1985. For reasons of convenience, where necessary the invention will be abbreviated by AR-NEM system.

Although the invention can be used in different network applications, here it will be described only for networks where distance- and service differentiated tariffs are applied, (see also FIELD OF THE INVENTION). Two examples of such network applications are for instance intercity telephone networks and integrated services networks (ISN). The invention can operate in the mixed digital and analog switch and transmission environment, but requires a certain number (ca 5) of switch nodes in the network to be of the Stored Program Control (SPC) type for beneficial operation.

The SPC nodes are controlled by a computer, while the non-SPC nodes are assumed to be controlled by any type of relay marker equipment. First, the invention will be described for networks accommodating only SPC nodes. Then it will be explained how calls originating in non-SPC nodes can benefit from the AR-NEM system.

Figure 1:
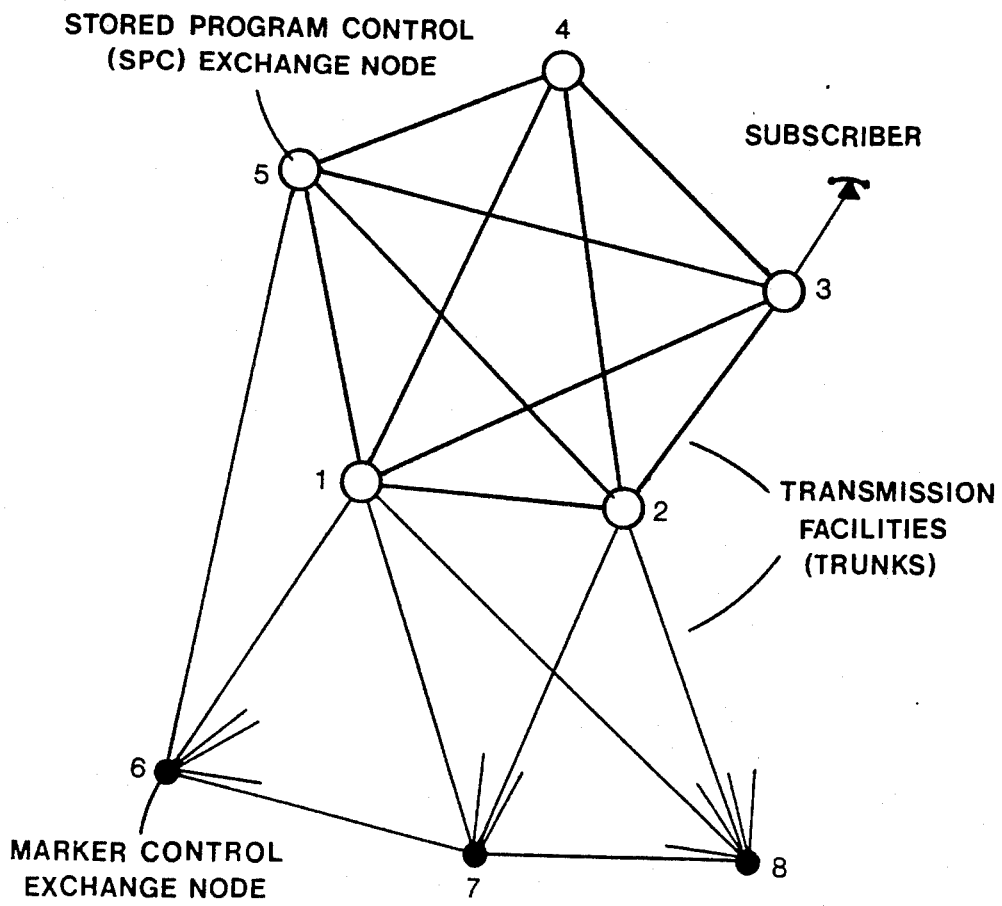
FIG. 1 is a schematic of a network using the stored program control {SPC} exchange nodes features of the present invention.
Figure 2:
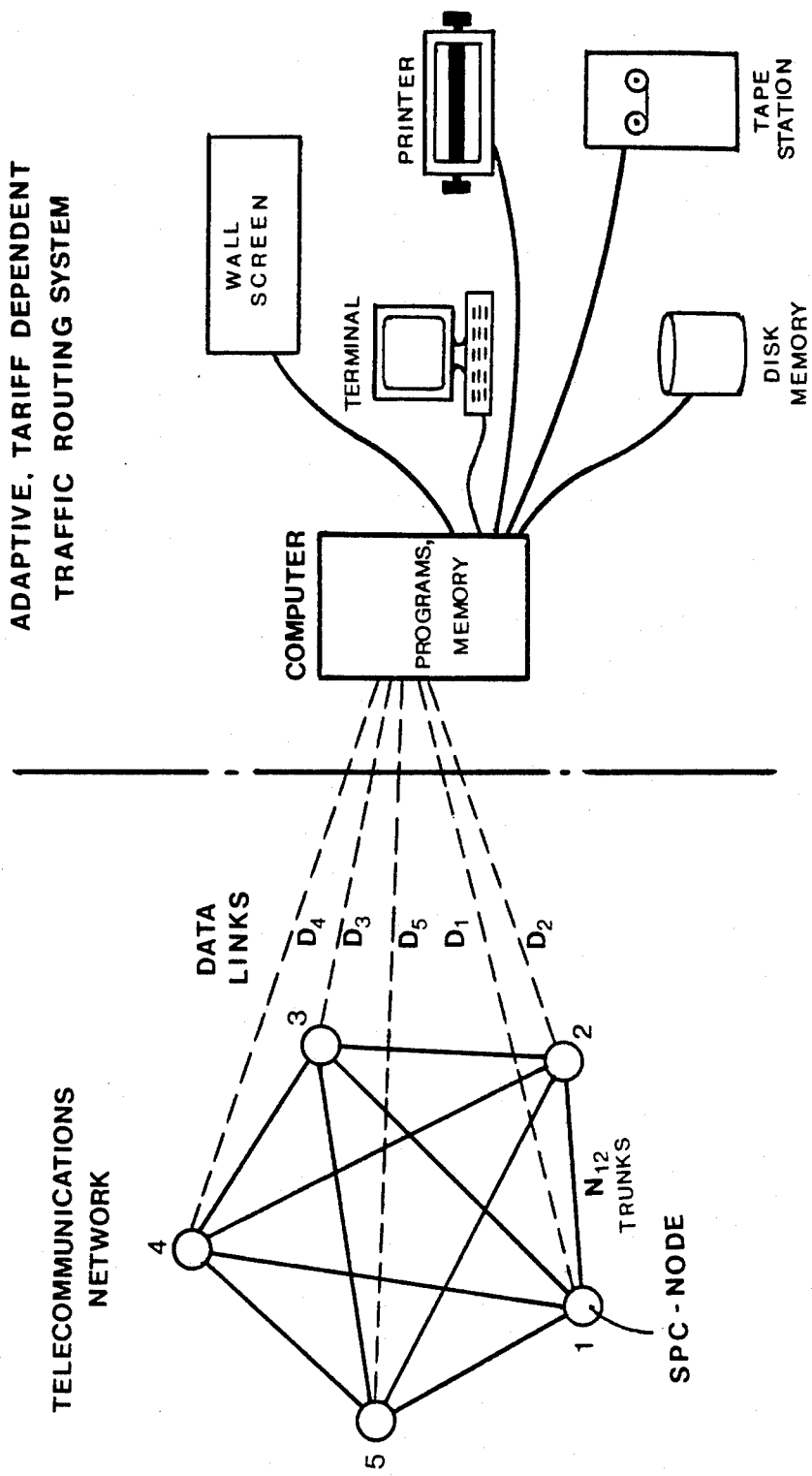
FIG. 2 is a schematic of an intercity telephone network according to the present invention consisting of five PSC exchange nodes and the transmission connections between them (trunk groups).

FIG. 2 shows an example of an intercity telephone network consisting of 5 SPC exchange nodes and transmission connections between them (trunk groups). In contrast to present intercity networks, here the exchanges do not need to be organized in hierarchy levels. Any of the exchange nodes can originate calls, receive calls and can be used as tandem for transit connections. FIG. 2 shows one of several possible realizations of the invention. It is built up of equipment available on the market. It consists of:

a computer for programs and fast access data,
a disk memory for data bases,
a tape station for storing statistics and back-up programs,
a screen and console terminal for system operation,
a printer for printing operational reports.

All this equipment is duplicated for reliability reasons. Display of network sectors can be done on a terminal screen, although a wall screen can be used optionally. The computer is connected to the SPC nodes of the network over two-way data communication links. The computer programs stored in the computer, perform the specific control function of the adaptive, tariff dependent traffic routing and automatic network management as defined in the invention. The equipment constitutes the operational aids.

The invention (AR-NEM System) performs the control of traffic routing in the network based on the following parameters:

(a) distance, service and time-of-day dependent tariffs; these are stored in data bases in the computer and in the disk memory;

(b) the actual traffic load and out-of-service indicators for the SPC nodes and for the interconnecting trunk groups; these are obtained through periodic scanning of the network by the computer of the AR-NEM System; the scanning interval depends somewhat on the actual network application; in normal cases, such as an intercity telephone network, the scanning interval is in the range of 3 to 20 seconds.

For the functional description of the invention, the following symbol definitions are used:

m=total number of SPC nodes in the network, which can also be used for overflow connections as transit nodes in tandem;
i=the number of an originating node;
j=the number of a destination node;
$N_{ij}$=number of channels in operation in the trunk group between nodes i and j;
$D_i$=the identity (number) of the data link connecting the AR-NEM System computer and node i;
$y_{ij}(k)$=call intensity for calls of service type k, originating in node i and destined to node j;
$h_i(k)$=average holding time for successful connections of service k, originating in node i;
$h(k)$=average holding time for the whole network, service k;
$c_{ij}(k)$=tariff; charging unit for calls of service k, per time unit of connection between nodes i and j;
$P_{ij}$=traffic indicator for trunk group i-j; it gives the actual number of occupied trunks in the trunk group between node i and j;
$N_{ij}$-$P_{ij}$=availability indicator for trunk group i-j, defined as follows:
  $N_{ij}$-$P_{ij}$>0; trunk group between node i and j is available for service;
  $N_{ij}$-$P_{ij}$=0; trunk group between node i and j is not available for service.

The switching elements in the nodes that are required for the set up of connections are:
  receivers,
  senders,
  connecting network,
  Central Processing Unit (CPU).

All the elements must be available for the successful set up of a connection. If any of the above elements is out-of-service, no connection can take place. Similarly, if any of the elements is overloaded, the call will be rejected, or must wait to be switched. Should the delay exceed a certain limit, the waiting call will be nevertheless rejected due to time-out. Thus a composite traffic and out-of-service indicator can be used for the nodes, as follows:

$$\begin{cases} r_{ix} = 1 & \text{if a receiver of type } x \text{ in node } i \text{ can} \\ & \text{be used for service;} \\ r_{ix} = 0 & \text{if no receiver of type } x \text{ in node } i \text{ is} \\ & \text{available for service;} \end{cases}$$

$$\begin{cases} s_{ix} = 1 & \text{if sender of type } x \text{ in node } i \text{ can be} \\ & \text{used for service;} \\ s_{ix} = 0 & \text{if no sender of type } x \text{ in node } i \text{ is} \\ & \text{available for service;} \end{cases}$$

$$\begin{cases} f_i = 1 & \text{if the connecting network of node } i \\ & \text{can be used for service;} \\ f_i = 0 & \text{if the connecting network of node } i \\ & \text{cannot be used for service;} \end{cases}$$

-continued $$\begin{cases} v_i = 1 & \text{if the central processing unit of node } i \\ & \text{can be used for service;} \\ v_i = 0 & \text{if the central processing unit of node } i \\ & \text{cannot be used for service.} \end{cases}$$

The composite traffic and out-of-service indicator for node i is defined as:

$$R_{ix} = r_{ix} \cdot s_{ix} \cdot f_i \cdot v_i$$

If the resulting value of the composite indicator $$\begin{cases} R_{ix} = 1 & \text{the node } i \text{ can be used for service} \\ & \text{associated with the receiver and sender} \\ & \text{of type } x; \\ R_{ix} = 0 & \text{the node } i \text{ cannot be used for service} \\ & \text{associated with the receiver and sender} \\ & \text{of type } x. \end{cases}$$

The values of the indicators ($R_{ix}$) can be set automatically, or manually by the operator of the node. In the case of automatic setting thresholds depend on the type of switch used in the different nodes.

The memory of the computer accommodates the network definition and the tariff information. The network is defined by the following parameters:

\*number of trunks $N_{ij}$, between nodes $i$ and $j$;

$i = 1, 2, \ldots m;$ $j = 1, 2, \ldots m; i \neq j;$

\*trunk type for each trunk group $i - j$; one-, or two-way;

$i = 1, 2, \ldots m;$ $j = 1, 2, \ldots m; i \neq j;$

In the case of two-way trunks, the same trunk type and number of trunks will occur for trunk group i-j as for group j-i. The tariff information is stored in form of charging units for calls of service k per time unit of connection between node i and j:

$c_{ij}(k)$;

$i = 1, 2, \ldots m;$ $j = 1, 2, \ldots m; i \neq j;$ $k = 1, 2, \ldots K;$ where K is the total number of services in the network. As a rule, for the same service $c_{ij}(k) = c_{ji}(k)$.

By periodic scanning of the network, the computer collects from each node the traffic and out-of-service parameters:

$R_{ix}; y_{ij}(k); h_i(k);$ and $p_{ij}$, or $N_{ij} - p_{ij}$;

These data are stored in the computer's memory.

The transfer of information from the SPC nodes to the computer is made over data links. Thus from node 1 the parameters:

$$p_{1j}; R_{1x}; y_{1j}(k); h_1(k);$$

$$j = 2, 3, +, \ldots m;$$

$$k = 1, 2, \ldots K;$$

are transferred to the computer over data link $D_1$. From node 2 the parameters:

$$p_{2j}; R_{2x}; y_{2j}(k); h_2(k);$$

$$j = 1, 3, \ldots m;$$

$$k = 1, 2, \ldots K;$$

are transferred to the computer over data link $D_2$, until the required data has been transferred to the computer from all the SPC nodes. In the practical realization of the system a certain flexibility exists. For instance, only the parameter $P_{ij}$ needs to be transferred at each scanning. The parameters $R_{ix}$ need to be transferred only when a change occurs, not necessarily at each scanning of the nodes. Similarly, measurements of the parameters $y_{ij}(k)$ and $h_i(k)$ are performed in the different nodes over a longer period of time and with less frequency than the network scanning. The average holding time for the entire network, $h(k)$ is calculated in the system's computer.

The scanning of the nodes can be performed in a sequential fashion. Should a data link be out-of-service it is indicated to the computer, so that it does not wait for information transfer from the corresponding node. In that case, the system will not receive any new data from the different nodes, but can still operate based on previous data until the data link connection has been reestablished. This is in, normal cases a temporary situation.

Once the data has been transferred from the nodes to the computer, the system has a global view of the actual situation in the network in terms of:
traffic load in the different trunk groups and in the different nodes;
out-of-service situation in the different trunk groups and in the different nodes
actual offered traffic originating in each node destined to any other node for each type of service;
actual holding time for each type of service.
Based on this global network view and on the
tariff information for each type of service, stored as data in the computer,
the system determines automatic traffic routing strategies and automatic network management interventions for each node and for each service provided by the network.

The type of service in this context is defined only by means of tariffs. Two functionally different services are considered to be of the same type if the applied tariffs are the same. The discrimination between services in the originating nodes can be done either by subscriber category, or by means of dedicated number codes.

The tariffs, however, depend also on the distances between the different nodes of the network. In order to explain the principle of routing traffic, such that maximum revenues are achieved, the case of a network providing only one type of service will be considered first. Then extension will be made to networks providing more than one service.

The general principle for routing traffic according to this invention is as follows:

(1) Calls originating in a SPC node i, destined to a node j are routed over the direct trunks between nodes i and j as a first choice.

(2) Should all the direct trunks between nodes i and j be occupied, out-of-service, or non-existing, the calls are routed over any other SPC nodes which can be reached from node i and which can reach node j; in this case the path is built up of two trunk groups used in tandem (a two-link path using 2 links in series); this alternative is used as a second choice.

(3) Should also all the two-link paths between nodes i and j be occupied, or a non-existing, any combination of three-link path can be used for the establishment of the connection; in this case 3 trunk groups are used in series and two SPC nodes are used in tandem between the originating node i and the destination j; this alternative is used as third choice.

In principle paths utilizing more than two tandem nodes can also be used. As will be shown later, using paths with more than 3 links in series will not result in substantial increase of the network's capacity, but would complicate the system.

The direct path between the originating node i and the destination j does not require any intervention from the AR-NEM system. The originating node can perform the necessary test of free direct trunks itself. The role of the AR-NEM system is to find suitable tandem paths between each SPC node and each other node (destination) to be used in case the direct trunks to the desired destination are occupied.

The selection of nodes as candidates for tandem connections is made according to a special algorithm, as follows:

(a) A two-link path is a candidate for tandem connection if the expected revenue from the connection is greater than the estimated loss of revenues from directly handled traffic in the two affected trunk groups, due to occupied trunks by the tandem connection.

(b) A three-link path is a candidate for tandem connection if the expected revenue from the connection is greater than the estimated loss of revenues from directly handled traffic in the three affected trunk groups, due to occupied trunks by the tandem connection.

The condition for allowing a two-link tandem connection to be set up can be deduced in the following way:

The expected revenue from a tandem connection of service type 1, between node i and j is:

$$h(1) \cdot c_{ij}(1);$$

If the tandem connection is not established, the expected revenue from traffic handled over direct trunks in group i-t, during the period of $h(1)$ time units is estimated to be:

$$h(1) \cdot y_{it}(1) \cdot [1 - B(N_{it}; p_{it})] \cdot c_{it}(1) \cdot h(1);$$

and if the tandem connection is established, the corresponding revenue is estimated to be:

$$h(1) \cdot y_{it}(1) \cdot [1 - B(N_{it} - 1; p_{it})] \cdot c_{it}(1) \cdot h(1);$$

Consequently, the expected loss of revenues from the directly handled traffic in trunk group i-t, due to an established tandem connection is estimated to be:

$$h(1) \cdot y_{it}(1) \cdot c_{it}(1) \cdot [B(N_{it}-1; p_{it}) - B(N_{it}; p_{it})] \cdot h(1);$$

where $B(N_{it}; p_{it})$ = conditional probability of all $N_{it}$ trunks being busy, given $p_{it}$ trunks have been observed to be occupied at the moment of network scanning.

This function is also dependent of the parameters $h(1)$ and $y_{it}(1)$.

It can be obtained either by using theoretical formulas, or by means of statistics. In the first case, experience shows that also simple approximations give satisfactory performance. For instance, Erlang's loss formula has been used as an approximation with satisfactory results. In that case $$B(N_{it}; p_{it}) = E(N_{it}; A_{it}(1));$$

$$A_{it}(1) = h(1) \cdot y_{it}(1);$$

However, when scanning the network, the number of occupied trunks in each trunk group $p_{it}$ is transferred from the different nodes to the AR-NEM computer. This applies also to the state $p_{it} = N_{it}$. Statistics can therefore be used to approximate the function $B(N_{it}; p_{it})$. In a similar way the expected loss of revenue for trunk group t-j can be obtained. Consequently, it is profitable to allow a tandem connection between nodes i and j to be set up if $$c_{ij}(1) > c_{it}(1) \cdot A_{it}(1) \cdot [B(N_{it}-1; p_{it}) - B(N_{it}; p_{it})] +$$

$$c_{tj}(1) \cdot A_{tj}(1) \cdot [B(N_{tj}-1; p_{tj}) - B(N_{tj}; p_{tj})];$$

else, at this point of time (until next scanning) it is more profitable to use the trunks in groups i-t and t-j for handling direct traffic, or use them for tandem connections between other nodes.

The resulting algorithm used for the search of a tandem path between nodes i and j is as follows:

(1) A node t can be used as tandem for a two-link connection between an originating node i and a destination node j if the following conditions are all satisfied at the same time;

$R_{tx} = 1$; node $t$ is available for service;

$N_{it} - p_{it} > 0$; trunk group $i - t$ can be used for service;

$N_{tj} - p_{tj} > 0$; trunk group $t - j$ can be used for service;

$$c_{ij}(1) > c_{it}(1) \cdot A_{it}(1) \cdot [B(N_{it}-1; p_{it}) - B(N_{it}; p_{it})] +$$

$$c_{tj}(1) \cdot A_{tj}(1) \cdot [B(N_{tj}-1; p_{tj}) - B(N_{tj}; p_{tj})];$$

(2) Nodes t and u can be used as tandems for a three-link connection between an originating node i and a destination node j if the following conditions are all satisfied at the same time:

$R_{tx} = 1; R_{ux} = 1;$ $N_{it} - p_{it} > 0; N_{tu} - p_{tu} > 0; N_{uj} - p_{uj} > 0;$ $$c_{ij}(1) > c_{it}(1) \cdot A_{it}(1) \cdot [B(N_{it}-1; p_{it}) - B(N_{it}; p_{it})] +$$

$$c_{tu}(1) \cdot A_{tu}(1) [B(N_{tu}-1; p_{tu}) - B(N_{tu}; p_{tu})] +$$

-continued $$c_{uj}(1) \cdot A_{uj}(1) \cdot [B(N_{uj}-1; p_{uj}) - B(N_{uj}; p_{uj})];$$

Should any of the traffic and/or out-of-service indicators not satisfy the conditions, the corresponding network element will be excluded from the path search resulting in an automatic by-pass of this equipment when routing a call through the network.

Similarly, if $c_{ij}(1)$ does not satisfy the inequality condition, it implies that it is not profitable at this moment to route a tandem connection from node i over the nodes t, or t and u, to the destination node j.

(3) The path search between node i and j is performed, only if the destination node j is in service, e.g.:

$R_{jx} = 1;$

Should this condition not be satisfied, calls destined to this node will not be allowed to enter the network, but will be rejected at the originating node i.

For practical realization of the invention, computer programs have been developed for the evaluation of the algorithm. These are stored in the AR-NEM system's computer, which performs the search of paths between each SPC node and each other node, based on the network data and according to the algorithm's conditions. Once the path search is completed, routing instructions are sent to the different SPC nodes. This is done over the data links.

A feasible path, if existing, is defined in terms of node identities. For instance, a two-link path is defined by the tandem node t and a three-link path is defined by the node identities t and u. Although in principle, a tandem connection can be set up over more than three links, for practical reasons the number of links here that can be used for tandem connections is limited to three. These routing instructions are then valid until the next scanning is performed and a new set of tandem identities has been transferred to the SPC nodes.

During the path search process, several cases may occur, such as:

(1) no feasible tandem path is available between nodes i and j;

(2) only one feasible tandem path exists between nodes i and j;

(3) several feasible paths exist between nodes i and j.

In the first case, the tandem identity is replaced by a special code, which is sent to the originating node, indicating network congestion between nodes i and j, and that only direct trunks, if feasible, can be used to reach the desired destination j. Should also all the direct trunks be occupied the originating node will reject calls destined to node j, without allowing them to enter the network.

If several feasible tandem paths exist between nodes i and j, the AR-NEM system will select at random two paths, I and II, to be tried in that order. Should the principal path I be snatched away, the second path (II) can be used automatically. Some possible situations that can occur are shown in FIG. 3a through 3d. Consequently, the type of information, in terms of tandem identities, defining the tandem paths depends on the actual situation in the network. Each node, however, will receive two identities, e.g. $t_1$ and $t_2$. Should only one path exist, $t_2$ will be replaced by $(-1)$. Should there not be any feasible tandem path between nodes i and j, both $t_1$ and $t_2$ will be replaced by $(-1)$. The arrangement in the nodes to accommodate the information and how it should be ued in order to route calls through the network depends on the type of switch used in the nodes. The arrangement includes also the limitation for any tandem connection to use more than three links. Although the arrangement has been developed for some type of switch it cannot be generally covered in this document, as it must be adapted to each particular network application.

Figure 4:
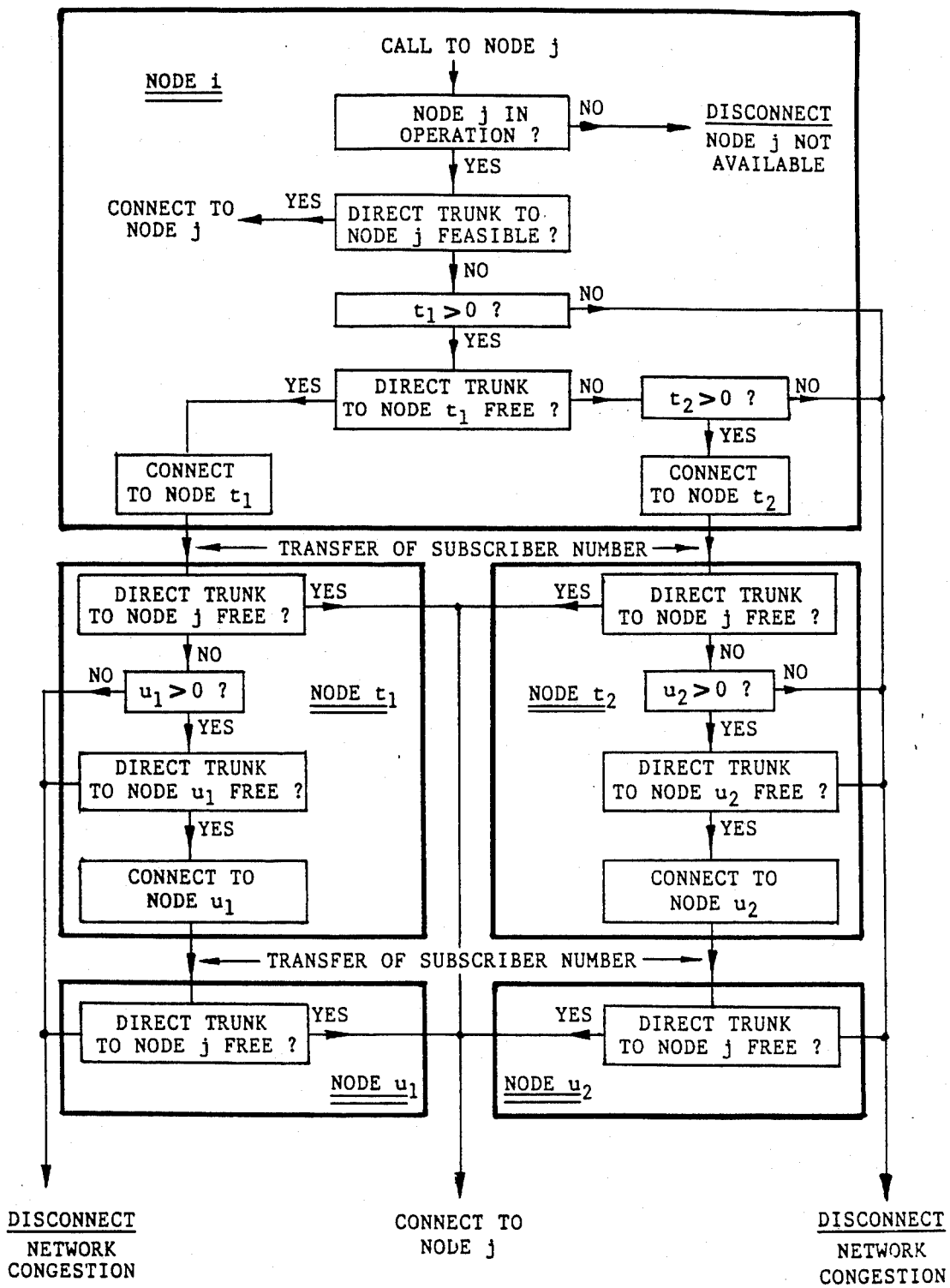
FIG. 4 is a flow chart illustrating the possible paths which a call may take utilizing the present invention.

The actual procedure for routing a call through the network is shown in FIG. 4. It applies to the case as shown in FIG. 3a, but can be generally adapted to all the other cases and to more than one service.

The described algorithm is valid for the case when the originating node is of SPC type. This restriction does not apply to the destination node, which can be of any type. For calls originating in non-SPC nodes an addition must be made. Non-SPC nodes, as a rule have marker control of mechanical type. Consequently, these cannot communicate with the AR-NEM system computer and cannot receive routing instructions from the system. Calls originating in non-SPC nodes can still use the direct trunks to the destination as a first choice. A tandem connection, however can be set up over the SPC-node network. In order to benefit from the adaptive, tariff dependent traffic routing a call originating in a non-SPC node must connect first to one of the SPC-nodes.

So far the function of the system was described assuming only one type of service in the network. In order to describe the system for more than one service it is necessary to define the relationship between the different service types. Here, it assumed that the service types differ in tariffs such that:

$$c_{ij}(1) > c_{ij}(2) > \ldots > c_{ij}(K);$$

The principle of the invention is to route traffic in a network such, that maximum revenues are achieved from the network operation. It is then obvious that the high tariff service will be handled with somewhat higher priority than the low tariff services. However, it must be underlined, that the network must be designed such, that at the engineering traffic level the assigned grade-of-service must be satisfied for all the services as required. Due to traffic variations, low tariff services will be handled by network facilities when and where the intensity of high tariff traffic is rather low and vice versa, the high tariff traffic will be protected during periods of network overload. In this way maximum possible revenues will be achieved.

The algorithm for routing traffic in multi-service networks is similar to that for one-service networks. The only difference is in the condition for setting up the connection. For multi-service networks this condition is as follows:

(1) A call of service k, originating in node i and destined to node j is allowed to use a direct trunk between those nodes if $$c_{ij}(k) > [B(N_{ij} - 1; p_{ij}) - B(N_{ij}; p_{ij})] \cdot \sum_{\mu=1}^{k-1} c_{ij}(\mu) \cdot A_{ij}(\mu);$$

(2) A call of service k, originating in node i and destined to node j can be set up as a two-link tandem connection over node t, if $$c_{ij}(k) > [B(N_{it} - 1; p_{it}) - B(N_{it}; p_{it})] \cdot \sum_{\mu=1}^{k} c_{it}(\mu) \cdot A_{it}(\mu) +$$

$$[B(N_{tj} - 1; p_{tj}) - B(N_{tj}; p_{tj})] \cdot \sum_{\mu=1}^{k} c_{tj}(\mu) \cdot A_{tj}(\mu);$$

(3) A call of service k, originating in node i and destined to node j can be set up as a three-link tandem connection over nodes t and u, if $$c_{ij}(k) > [B(N_{it} - 1; p_{it}) - B(N_{it}; p_{it})] \cdot \sum_{\mu=1}^{k} c_{it}(\mu) \cdot A_{it}(\mu) +$$

$$[B(N_{tu} - 1; p_{tu}) - B(N_{tu}; p_{tu})] \cdot \sum_{\mu=1}^{k} c_{tu}(\mu) \cdot A_{tu}(\mu) +$$

$$[B(N_{uj} - 1; p_{uj}) - B(N_{uj}; p_{uj})] \cdot \sum_{\mu=1}^{k} c_{uj}(\mu) \cdot A_{uj}(\mu);$$

where $A_{ij}(k) = y_{ij}(k) \cdot h(k)$;

Note that services of higher tariff than $c_{ij}(k)$ satisfy also these conditions.

The traffic routing algorithm can also be used in flat rate networks, such as the metropolitan telephone networks. In those networks the same tariff is used for all calls, independently of service type, or the distance between the originating node and the destination. Thus, the tariff can be set to be:

$$c_{ij}(k) = 1;$$

for all i, j and k values. In those cases the condition is as follows:

(1) A call originating in node i and destined to node j is using a direct trunk between those nodes as a first choice. Should all the direct trunks be occupied, or not available for service, then:

(2) a two-link tandem connection can be used, if:

$$1 > [B(N_{it} - 1; p_{it}) - B(N_{it}; p_{it})] \cdot A_{it} +$$

$$[B(N_{tj} - 1; p_{tj}) - B(N_{tj}; p_{tj})] \cdot A_{tj};$$

(3) and a three-link tandem connection can be used, if:

$$1 > [B(N_{it} - 1; p_{it}) - B(N_{it}; p_{it})] \cdot A_{it} +$$

$$[B(N_{tu} - 1; p_{tu}) - B(N_{tu}; p_{tu})] \cdot A_{tu} +$$

$$[B(N_{uj} - 1; p_{uj}) - B(N_{uj}; p_{uj})] \cdot A_{uj};$$

where $A_{ij}$ = total traffic offered from node i to node j. In the case of flat rate networks, the traffic handled by the network is automatically maximized. The tandem connections will be allowed if it is expected that these will result in increased traffic handled. Tandem connections will not be allowed if it is estimated that these would prevent the trunks from handling direct traffic resulting in higher total handled traffic. This will be mostly the case when the network is overloaded. Thus, the invention (AR-NEM system) protects automatically the network against undesirable effects of overload.

In all the cases the tandem nodes must satisfy the conditions:

$t \neq i;\ t \neq j;$ $u \neq i;\ u \neq j;\ u \neq t;$

The tandem identities once stored in the nodes are valid until next set of feasible tandem identities has been determined and sent to the different nodes. This feature provides an automatic back-up system. In case all the data links are out-of-service, or the AR-NEM system computer is out-of-service the network will still operate based on the tandem identities stored in the nodes. These data will be used until faulty devices have been repaired and put in operation again. At that moment the network will automatically return to normal AR-NEM operations. During the period of complete system failure, the network will route traffic depending on the last network situation observed. In the best case, the routine scheme will correspond to that shown in FIG. 3a.

As an example, feasible two-link paths will be determined between node 1 and 2 in the 5-node network as shown in FIG. 2. It is assumed to be an intercity network, providing only one service. The following assumed data apply;

all nodes in service;

average holding time, h(1)=200 seconds;

for simplicity reasons, the function B(N;p) will be approximated by Erlang's Loss Formula, e.g.:

$$B(N;p) \approx E(N;A) = \frac{\frac{A^N}{N!}}{\sum_{v=0}^{N} \frac{A^v}{v!}}$$

TABLE 1

$N_{ij}$, Number of trunks in operation.

| FROM NODE i | TO NODE j | | | | |
|---|---|---|---|---|---|
| | 1 | 2 | 3 | 4 | 5 |
| 1 | — | 10 | 15 | 10 | 20 |
| 2 | 12 | — | 10 | 12 | 15 |
| 3 | 16 | 12 | — | 15 | 12 |
| 4 | 10 | 12 | 10 | — | 0 |
| 5 | 18 | 12 | 15 | 0 | — |

TABLE 2

$p_{ij}$, Number of occupied trunks.

| FROM NODE i | TO NODE j | | | | |
|---|---|---|---|---|---|
| | 1 | 2 | 3 | 4 | 5 |
| 1 | — | 10 | 10 | 7 | 16 |
| 2 | 10 | — | 6 | 10 | 11 |
| 3 | 13 | 8 | — | 15 | 6 |
| 4 | 7 | 9 | 8 | — | 0 |
| 5 | 15 | 8 | 15 | 0 | — |

TABLE 3

$A_{ij}(1)$, The actual traffics in erlangs.

| FROM NODE i | TO NODE j | | | | |
|---|---|---|---|---|---|
| | 1 | 2 | 3 | 4 | 5 |
| 1 | — | 7.0 | 10.0 | 8.0 | 15.0 |
| 2 | 11.0 | — | 7.0 | 11.0 | 11.0 |
| 3 | 13.0 | 8.0 | — | 15.0 | 6.0 |
| 4 | 7.0 | 10.0 | 8.0 | — | 0.0 |
| 5 | 16.0 | 7.0 | 15.0 | 0.0 | — |

TABLE 4

$c_{ij}(1)$, Tariffs.

| FROM NODE i | TO NODE j | | | | |
|---|---|---|---|---|---|
| | 1 | 2 | 3 | 4 | 5 |
| 1 | — | 2 | 3 | 4 | 2 |
| 2 | 2 | — | 2 | 3 | 3 |
| 3 | 3 | 2 | — | 2 | 4 |
| 4 | 4 | 3 | 2 | — | 2 |
| 5 | 2 | 3 | 4 | 2 | — |

The possible two-link paths between nodes 1 and 2, as shown in FIG. 2, are:

$(i - t - j):\ 1 - 3 - 2$ $1 - 4 - 2$ $1 - 5 - 2$

Further from Tables 1 and 2 it can be seen that:

$N_{13} - p_{13} > 0;$ $N_{14} - p_{14} > 0;$ $N_{15} - p_{15} > 0;$ $N_{32} - p_{32} > 0;$ $N_{42} - p_{42} > 0;$ $N_{52} - p_{52} > 0;$

Feasible two-link tandem paths are those for which:

$c_{ij}(1) > F_t = c_{it}(1) \cdot A_{it}(1) \cdot [E(N_{it} - 1;\ A_{it}(1)) - E(N_{it};\ A_{it}(1))] +$ $c_{tj}(1) \cdot A_{tj}(1) \cdot [E(N_{tj} - 1;\ A_{tj}(1)) - E(N_{tj};\ A_{tj}(1))];$ where $E(N_{yz};A_{yz}(1))$ can be obtained from Erlang's table. For i=1 and j=2, $c_{12}(1)=2$. Then for t=3, $c_{13}(1)=3$ and $c_{32}(1)=2$, the value of F can be calculated according to the above formula:

$F_3 = 3 \cdot 10.0 \cdot E(14;10.0) - E(15;10.0) +$ $2 \cdot 8.0 \cdot E(11;8.0) - E(12;8.0) =$ $30 \cdot (0.0568 - 0.0365) + 16 \cdot (0.0813 - 0.0515) = 1.086$ Similarly, for $t = 4$, $c_{14}(1) = 4$ and $c_{42}(1) = 3\ F_4 = 2.920$ for $t = 5$, $c_{15}(1) = 2$ and $c_{52}(1) = 3\ F_5 = 0.981$ For nodes 3 and 5, $c_{12}(1) > F_3$ and $c_{12}(1) > F_5$ respectively. Hence, these nodes can be used as candidates for feasible two-link tandem paths. For node t=4, $c_{12}(1) < F_4$. In this case, therefore, it is more profitable to use the trunk groups 1-4 and 4-2 for direct traffic.

Figure 5:
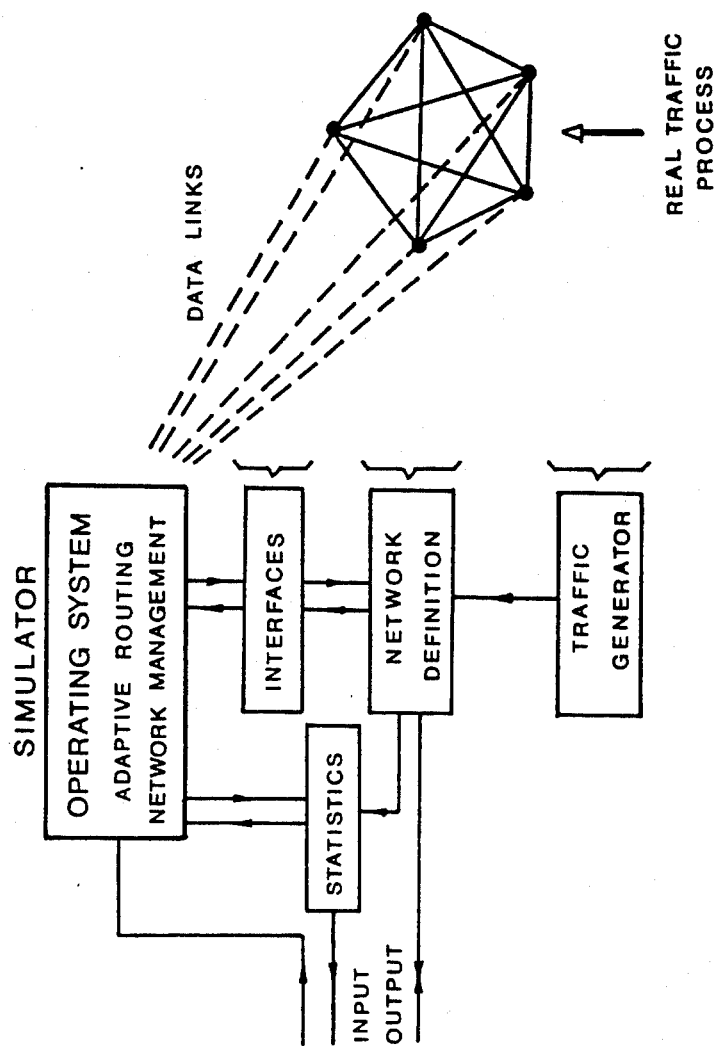
FIG. 5 is a schematic showing the general design of a computer-based simulator and the relationship between the real network and the configuration in the computer-based simulator.

For the purposes of system testing and network performance testing, the AR-NEM software has been used to create a computer-based emulator. Additional software modules have been developed in order to generate traffic and perform traffic measurements, as well as print statistics. FIG. 5 shows the general design of the emulator and the relationship between the real network configuration and the computer-based emulator. Since the emulator is using the real AR-NEM programs, running the emulator, the statistics will reflect the AR- NEM system performance and the network performance as they would do in real life. Several system and network studies have been performed using the emulator, as regards normal load, overload as well as different out-of-service situations, such as:

a node is out-of-service,
one, or several trunk groups are out-of-service,
the AR-NEM computer is out-of-service.

The results of the studies have been presented, as mentioned earlier, at the 11 International Teletraffic Congress, in Kyoto, Sept. 4–11, 1985 in the paper "Adaptive, Tariff Dependent Traffic Routing and Network Management in Multi-Service Networks". Using the network emulator, networks using present routing techniques can also be studied. FIGS. 6 and 7 show extracts from results. FIG. 7 shows the results of network performance when traffic routing is performed under the command of the AR-NEM system and FIG. 6 shows the results when the fixed-hierarchical traffic routing is used. The results apply in both cases to the same network and the same traffic conditions. It is a 16-node intercity network, handling two types of services. The results demonstrate the following:

as can be seen in FIG. 6, the present art, fixed-hierarchical routing does not take into account the service and distance differentiated tariffs; the node-to-node congestion is the same for the two services, or 0.057, which is the same as the average for the entire network;

in FIG. 7 it can be seen that the adaptive, tariff dependent routing provides of much better grade-of-service; the average congestion for the entire network, in this case is only 0.011 as compared to 0.057 above; the high tariff service 1, experiences somewhat lower congestion or 0.005, than the low tariff service 2, which experiences a congestion of 0.017;

similarly, it can be seen that the adaptive, tariff dependent routing results in higher revenues than the present art, fixed-hierarchical routing; in addition to the better grade-of-service, the total revenues in the first case are 183 227.2 units while in the second case the total revenues are 177 682.2 units;

as could be expected, the increase of revenues is mainly coming from the high tariff service 1, from 119 595.6 to 123 878.2, while the revenues for the low tariff service 2, increase only from 58 086.6 to 59 349.0 units; this effect, clearly demonstrates the efficiency of the adaptive, tariff dependent traffic routing mechanism.

For other results, see the paper referenced above.

The capacity requirement for the AR-NEM system computer depends on the number of nodes in the network, but not on the traffic load in the network. Therefore, the AR-NEM system is practically insensitive to network traffic overload. However, the incident of path snatching increases with increasing network load and with increasing length of scanning interval. The scanning interval, therefore, should be kept on a low level.

Figure 8:
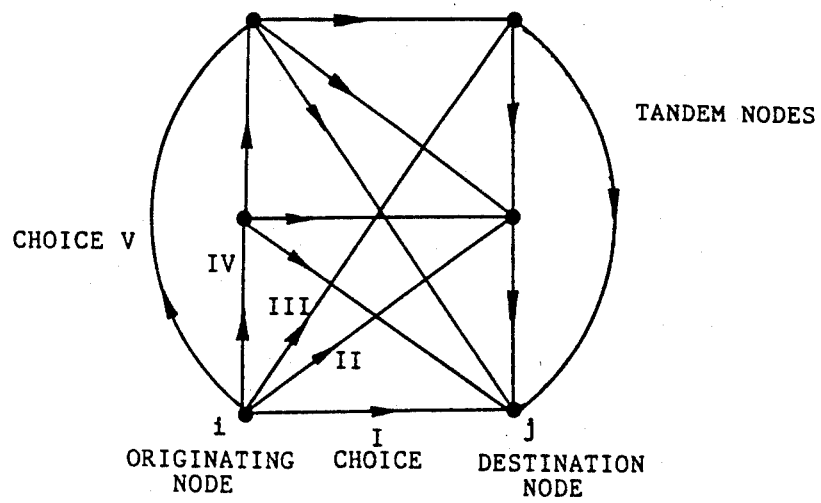
FIG. 8 is a schematic of an intercity network configuration using the prior art fixed hierarchical routing method.
Figure 9:
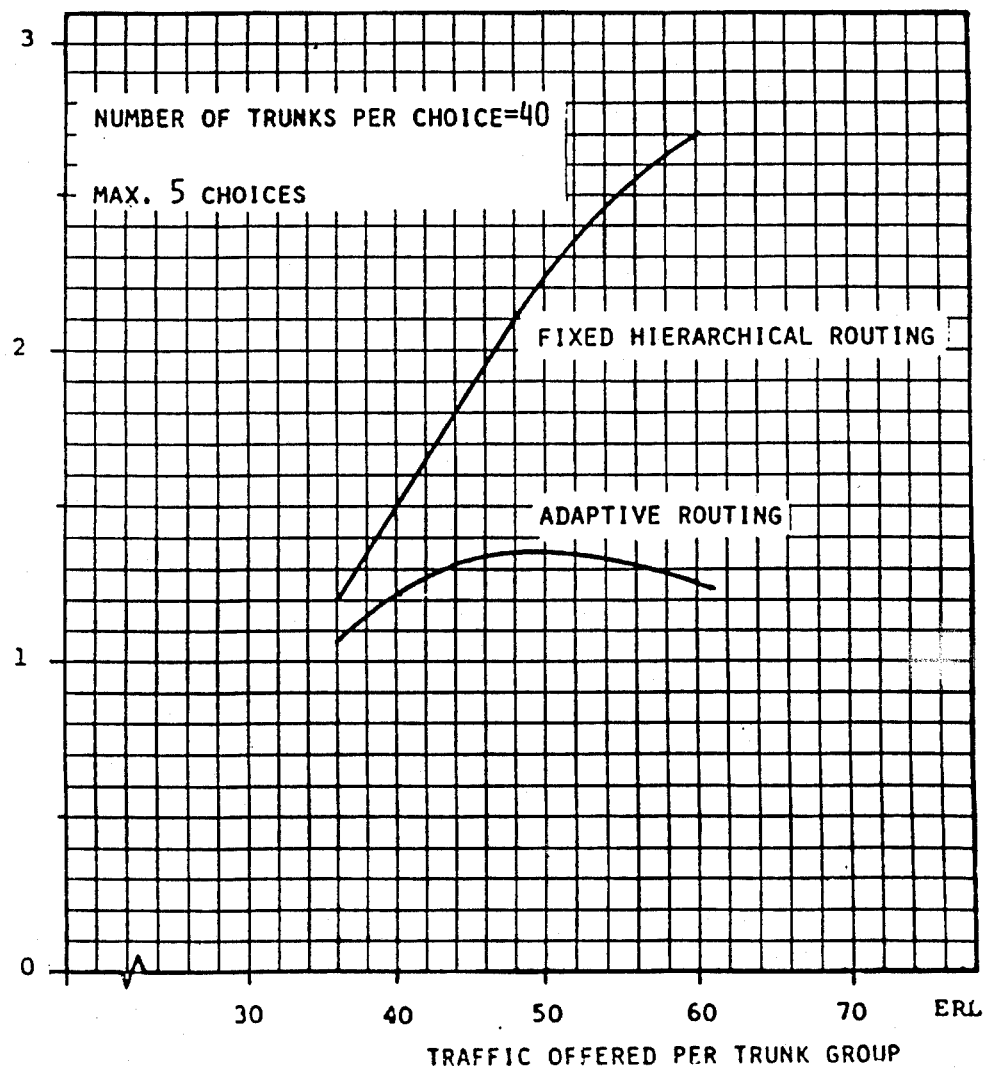
FIG. 9 is a graph showing the results of a study demonstrating the difference in the number of choices tried in a node, both in the case of the prior art fixed-hierarchical routing and in the case of the adaptive, tariff dependent traffic routing of the present invention.

In the present art, fixed-hierarchical networks, when searching for a free trunk in the originating node, several trunk groups may be tested before a free trunk is found. Especially in the intercity networks, the number of choices tried can be in the range of five, see FIG. 8. It is time consumming for the control systems (CPU:s) of the SPC nodes. In the case of adaptive, tariff dependent routing, the situation is different. The computer of the AR-NEM system provides the SPC nodes with information on trunk groups where free trunks can be found. Consequently, the SPC nodes do not need to test all the choices, but at the most two trunk groups as defined for the two alternative tandem paths I and II by the respective tandems $t_1$ and $t_2$. The search for a free tunk is in this case much less time consumming and hence, the invention is deloading the CPU:s of the different SPC nodes. FIG. 9 shows results of a study demonstrating the difference in the number of choices tried in a node, in the case of fixed-hierarchical routing and in the case of the adaptive, tariff dependent traffic routing.

What is claimed is:

1. A computer based, adaptive traffic routing and automatic network managing system for multi-service telecommunications networks, said system comprising:
   a plurality of nodes;
   a plurality of transmission trunks connecting the nodes;
   means for determining a tariff, in communication with the nodes, for each communication between said nodes, said tariff being determined depending on distance between said nodes and on other parameters including type of service provided; and
   means dependent on said tariffs for providing the nodes with instructions for routing connections within the network of nodes such that revenues of handled communications are maximized and such that trunks and nodes which are not available for service are automatically bypassed.

2. The system defined in claim 1 wherein the means for determining a tariff and the means for providing the nodes with instructions for routing connections comprise a computer having a data base, the tariff information being stored in the data base wherein a plurality of the nodes are Stored Program Control (SPC) nodes and wherein information is stored in the data base relating to overall network status in terms of actual traffic offered in each SPC node to each other node and actual availability for service of each trunk group and node.

3. The system defined in claim 2 wherein for calls originating in each SPC node i to each other destination node j, the direct trunks between the nodes will be indicated to be used as a first choice and two other alternative paths I and II will be indicated, one of them comprising a two-link path over a tandem node t to be used as a second choice and the other comprising a three-link path over tandem nodes t and u respectively to be used as a third choice.

4. The system defined in claim 3 wherein the indicators for paths in terms of direct trunks and/or identities of tandem nodes t and u respectively, for calls originating in the SPC node i to any destination node j are determined according to the following algorithm:
   (a) calls of service type k with the related tariff $c_{ij}(k)$, where:

$$c_{ij}(1) > c_{ij}(2) > \cdots > c_{ij}(K);$$

will be indicated to use direct trunks between nodes i and j as a first choice, if
   the destination node j is available for service, $R_{jx} = 1$) and
   the trunk group between node i and j has at least one trunk available for service, $(N_{ij} - P_{ij} > 0)$ and
   the actual traffic and occupancy status for the trunk group between nodes i and j is such that the expected revenue from a connection of service k is greater than the estimated loss of revenue due to this connection, from services of higher tariffs, which mathematically can be expressed as:

$$c_{ij}(k) > [B(N_{ij} - 1;p_{ij}) - B(N_{ij};P_{ij})] \cdot \sum_{\mu=1}^{k-1} c_{ij}(\mu) \cdot A_{ij}(\mu) +$$

(b) node t as a feasible tandem for a two-link path is determined, if
  the destination node j is available for service, ($R_{jx}=1$) and such, for which
  the tandem node t is available for service, ($R_{tx}=1$) and
  trunk groups between nodes i and t as well as between nodes t and j, each have at least one trunk available for service, ($N_{it}-P_{it}>0$ and $N_{tj}-P_{tj}>0$) and
  the expected revenue from the service k tandem connection is greater than the estimated loss of revenues, due to this connection from traffic that could be handled over direct trunks in the two trunk groups i-t and t-j, which mathematically can be expressed as:

$$c_{ij}(k) > [B(N_{it} - 1;P_{it}) - B(N_{it};P_{it})] \cdot \sum_{\mu=1}^{k} c_{it}(\mu) \cdot A_{it}(\mu) +$$

$$B(N_{tj} - 1;P_{tj}) - B(N_{tj};P_{tj}) \cdot \sum_{\mu=1}^{k} c_{tj}(\mu) \cdot A_{tj}(\mu);$$

(c) nodes t and u as feasible tandems for a three-link tandem path are determined, if
  the destination node j is available for service, ($R_{jx}=1$) and such, for which
  the tandem nodes t and u are available for service, ($R_{tx}=1$ and $R_{ux}=1$) and
  the trunk groups between nodes i and t, between nodes t and u and between nodes u and j each have at least one trunk available for service, ($N_{it}-P_{it}>0$, $N_{tu}-P_{tu}>0$ and $N_{uj}-P_{uj}>0$) and the expected revenue from the service k tandem connection is greater than the estimated loss of revenues, due to the tandem connection from traffic that could be handled over direct trunks in the three trunk group i-t, t-u and u-j, which can be expressed mathematically as:

$$c_{ij}(k) > [B(N_{it} - 1;p_{it}) - B(N_{it};p_{it})] \cdot \sum_{\mu=1}^{k} c_{it}(\mu) \cdot A_{it}(\mu) +$$

$$B(N_{tu} - 1;P_{tu}) - B(N_{tu};P_{tu})] \cdot \sum_{\mu=1}^{k} c_{tu}(\mu) \cdot A_{tu}(\mu) +$$

$$B(N_{uj} - 1;P_{uj}) - B(N_{uj};P_{uj})] \cdot \sum_{\mu=1}^{k} c_{uj}(\mu) \cdot A_{uj}(\mu);$$

where:
  i = number of an originating node; i = 1, 2, - - - m;
  j = number of a terminating node; j = 1, 2, - - - m; j ≠ i;
  m = total number of Stored Program Control nodes in the network, which can be used as tandems;
  k = number of a service type; k = 1, 2, - - - K;
  m = number of another service type;
  K = total number of services;
  $c_{jk}(k)$ = tariff per time unit of communication between nodes i and j for service type k;
  $R_{jx}$ = availability indicator for node j;
  $R_{jx}=1$, indicates that node j is available for service associated with receiver and sender x;
  $N_{ij}$ = total number of trunks in operation in trunk group between nodes i and j;
  $P_{ij}$ = the actual number of occupied trunks in trunk group between nodes i and j;
  $A_{ij}(k)$ = traffic of service type k, offered from node i to node j; $A_{ij}(k) = y_{ij}(k) \cdot h_i(k)$;
  $y_{ij}(k)$ = call intensity of service type k, offered in node i to node j;
  $B(N;p)$ = conditional probability of all N trunks busy, given p trunks have been observed to be occupied at the moment of network scanning;
  can be approximately calculated from $$B(N;p) \approx \frac{\frac{A^N}{N!}}{\sum_{\nu=0}^{N} \frac{A^\nu}{\nu!}}$$

A = total traffic offered to N trunks;
  t = identify (number) of tandem node 1; t = 1, 2, - - - m; t ≠ i, t ≠ j;
  u = identity (number) of tandem node 2; u = 1, 2, - - - m; u ≠ i; u ≠ j; u ≠ t; and
  $h_i(k)$ = average holding time for service type k, originating in node i.

5. The system defined in claim 4 wherein the algorithm is applied to only one type of service, e.g.:

$c_{ij}(1) > 0$ and $c_{ij}(2) = c_{ij}(3) = - - - = c_{ij}(K) = 0$;

$A_{ij}(1) > 0$ and $A_{ij}(2) = A_{ij}(2) = - - - = A_{ij}(K) = 0$;

in which case the system is directly applicable to present intercity telephone networks.

6. The system defined in claim 5 wherein the tariff for a communication is equal to unity, e.g.:

$c_{ij}(1) = 1$;

in which case the system is directly applicable to flat rate networks, such as present metropolitan telephone networks.

7. The system defined in claim 4 wherein the two alternative paths I and II, if more than one route is feasible for either or both types of alternative paths, are respectively selected at random for the type or types having more than one feasible path and where the alternative I is used as a principal tandem path and alternative II is used only in case path I is unavailable.

8. The system defined in claim 7 wherein the routing instructions in terms of tandem node identities are transferred to the SPC nodes over data links provided between the nodes and the system's computer and wherein these data links are serving also for transfer of data from the SPC nodes to the computer in terms of indicators for:
  (a) node-to-node offered call intensities, $y_{ij}(k)$;
  (b) trunk group availabilities, $P_{ij}$, or $N_{ij}-P_{ij}$;
  (c) average holding times, $h_i(k)$;
  (d) node availabilities, $R_{ix}$;

9. The system defined in claim 8 wherein on-demand interventions and man-machine communication are performed by means of a special System Management & Intervention Language SMIL.

10. The system defined in claim 9 wherein routing instructions stored in the SPC nodes serve as a back-up in case all communication means between the SPC nodes and the system's said computer are out-of-service.

* * * * *

UNITED STATES PATENT AND TRADEMARK OFFICE
CERTIFICATE OF CORRECTION

PATENT NO. : 4,756,019

DATED : July 5, 1988

INVENTOR(S) : Edmund Szybicki

It is certified that error appears in the above-identified patent and that said Letters Patent is hereby corrected as shown below: On the title page, under the heading OTHER PUBLICATIONS, line 7: "E. Syzbicki" should read --E. Szybicki-- Under the heading ABSTRACT, line 4: "cast" should read --cost--

Column 3, line 11: "PSC" should read --SPC--

Column 8, line 17: "or a non-existing" should read --or non-existing--

Column 11, line 1: "be ued in" should read --be used in--

Column 11, line 34: "it assumed that" should read --it is assumed that--

Column 13, line 18: "the routine" should read --the routing--

Column 14, lines 45 and 46: (missing brackets)
" $F_3 = 3 \cdot 10.0 \cdot E(14;10.0) - E(15;10.0) +$ $2 \cdot 8.0 \cdot E(11;8.0) - E(12;8.0) = $ " should read -- $F_3 = 3 \cdot 10.0 \cdot [E(14;10.0) - E(15;10.0)] +$ $2 \cdot 8.0 \cdot [E(11;8.0) - E(12;8.0)] = $ --

Column 15, Line 30: "provides of much" should read --provides a much--

9. Column 16: Line 3: "tunk" should read --trunk--

Line 59: " $R_{jx} = 1)$ " should read --$(R_{jx} = 1)$--

10. Column 17, formula on the first line: the sign "+" at the end of the formula is not needed.

Column 17, formula on line 22 - 25: the parameter "$P_{ij}$" should read --$P_{it}$-- also brackets missing . . . therefore:
"$c_{ij}(k) > [B(N_{it} - 1;P_{it}) - B(N_{it};P_{ij})] \cdot \sum_{\mu=1}^{k} c_{ir}(\mu) \cdot A_{ir}(\mu) +$ $B(N_{tj} - 1;P_{tj}) - B(N_{tj};P_{tj}) \cdot \sum_{\mu=1}^{k} c_{tj}(\mu) \cdot A_{tj}(\mu);$" should read --$c_{ij}(k) > [B(N_{it} - 1;P_{it}) - B(N_{it};P_{it})] \cdot \sum_{\mu=1}^{k} c_{ir}(\mu) \cdot A_{ir}(\mu) +$ $[B(N_{tj} - 1;P_{tj}) - B(N_{tj};P_{tj})] \cdot \sum_{\mu=1}^{k} c_{tj}(\mu) \cdot A_{tj}(\mu);$ --

UNITED STATES PATENT AND TRADEMARK OFFICE
CERTIFICATE OF CORRECTION

PATENT NO. : 4,756,019

DATED : July 5, 1988

INVENTOR(S) : Edmund Szybicki

It is certified that error appears in the above-identified patent and that said Letters Patent is hereby corrected as shown below:

Column 17, formula on lines 47-54: brackets missing:

"$c_{ij}(k) > [B(N_{it} - 1;P_{it}) - B(N_{it};P_{it})] \cdot \sum_{\mu=1}^{k} c_{ir}(\mu) \cdot A_{ir}(\mu) + B(N_{tu} - 1;P_{tu}) - B(N_{tu};P_{tu})] \cdot \sum_{\mu=1}^{k} c_{tu}(\mu) \cdot A_{tu}(\mu) + B(N_{uj} - 1;P_{uj}) - B(N_{uj};P_{uj})] \cdot \sum_{\mu=1}^{k} c_{uj}(\mu) \cdot A_{uj}(\mu);$" should read --$c_{ij}(k) > [B(N_{it} - 1;P_{it}) - B(N_{it};P_{it})] \cdot \sum_{\mu=1}^{k} c_{ir}(\mu) \cdot A_{ir}(\mu) + [B(N_{tu} - 1;P_{tu}) - B(N_{tu};P_{tu})] \cdot \sum_{\mu=1}^{k} c_{tu}(\mu) \cdot A_{tu}(\mu) + [B(N_{uj} - 1;P_{uj}) - B(N_{uj};P_{uj})] \cdot \sum_{\mu=1}^{k} c_{uj}(\mu) \cdot A_{uj}(\mu);$ --

Column 17, line 62: The definition of the parameter "m" on line 62 is conflicting with that on line 59. That on line 62 should be deleted.

UNITED STATES PATENT AND TRADEMARK OFFICE
CERTIFICATE OF CORRECTION

PATENT NO. : 4,756,019

DATED : July 5, 1988

INVENTOR(S) : Edmund Szybicki

It is certified that error appears in the above-identified patent and that said Letters Patent is hereby corrected as shown below:

Column 18, line 6: "$h_j(k)$;" should read --$h_i(k)$;--

Column 18, line 31: the expression

"$A_{ij}(1)>0$ and $A_{ij}(2)=A_{ij}(2)=$ --- $A_{ij}(K)=0$;" should read

--$A_{ij}(1)>0$ and $A_{ij}(2)=A_{ij}(3)=$ --- $A_{ij}(K)=0$;--

Signed and Sealed this

Eighth Day of September, 1992

*Attest:*

DOUGLAS B. COMER

*Attesting Officer*  *Acting Commissioner of Patents and Trademarks*